UNITED STATES PATENT OFFICE.

ANTON MESSERSCHMITT, OF FRANKFORT-ON-THE-MAIN, GERMANY, ASSIGNOR, BY MESNE ASSIGNMENTS, TO CORPORATION INTERNATIONALE "WASSERSTOFF" AKTIENGESELLSCHAFT, OF FRANKFORT-ON-THE-MAIN, GERMANY.

PROCESS OF PRODUCING HYDROGEN.

971,206. Specification of Letters Patent. Patented Sept. 27, 1910.

No Drawing. Application filed December 2, 1908. Serial No. 465,686.

*To all whom it may concern:*

Be it known that I, ANTON MESSERSCHMITT, resident of Finkenhofstrasse No. 5, Frankfort-on-the-Main, Kingdom of Prussia, German Empire, have invented new and useful Improvements in Processes of Producing Hydrogen, of which the following is a specification.

The production of hydrogen, according to the well-known process, is effected by oxidizing incandescent metallic iron by means of steam, thus producing the black or magnetic oxid of iron ($Fe_3O_4$) and hydrogen. According to the present invention however, instead of employing common iron for this purpose spongy iron is employed which must be produced from fragmentary oxid iron-ore (*i. e.* an ore containing $Fe_2O_3$). Only spongy iron produced from such oxidized iron ore possesses the requisite porosity and strength for carrying out the present process, properties which it will preserve even after repeated reduction and oxidation (by steam), while being at the same time sufficiently capable of reaction. Therefore it is not only the use of ferric oxid as such, but also the necessity of starting from an oxid iron ore which forms a characteristic feature of the present process.

The effect of using ferric oxid as raw material is that the oxid after reduction becomes porous throughout its entire mass on account of the decrease in volume consequent upon the removal of the oxygen therefrom and thus a greatly increased surface is exposed to the subsequent action of the steam. The use of ferric oxid in the form of oxid ores is necessary and important because it has been found that lumps of this ore, in consequence of its peculiar natural texture maintain their shape in spite of repeated reductions and oxidations and that the ore possesses the necessary strength to withstand the pressure of the superimposed layers of ore; if this were otherwise the path for the gases would become choked by the crumbling of the ferric oxid and continuous working would be impeded. Moreover the peculiar distribution of the gangue, clay, silica and other components of the ore has for effect to prevent in spite of high temperatures which may be produced either intentionally or in consequence of irregular working of the furnace a conglomeration or sintering of the charge, the latter thus constituting a sort of rigid incombustible carrier for the oxids and the iron sponge.

The different uses to which hydrogen is put, especially that of aeronautics, generally demand great purity of the gas so that in the production of hydrogen special attention must be paid to this point if the process is to possess commercial utility. Special means have therefore to be devised for obtaining pure gas.

Before describing the novel process it is necessary to explain the causes to which the presence of carbon monoxid in hydrogen gas-mixtures as at present produced, is to be ascribed, *i. e.* when no special steps to insure purity are taken. If ferric oxid be reduced by means of carbon monoxid metallic iron and carbon dioxid is formed, but simultaneously a considerable quantity of carbon is precipitated from the carbon monoxid. Hence, if after completion of the reduction phase of the process, steam be led over the mixture containing spongy iron thereby produced, there is produced not only hydrogen according to the equation,

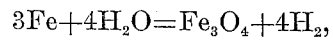
$$3Fe + 4H_2O = Fe_3O_4 + 4H_2,$$

but also at the same time carbon monoxid and carbon dioxid resulting from the reaction of the steam on the carbon present, thus contaminating the hydrogen. Since the carbon present is incompletely decomposed by the steam at the comparatively low temperatures present, the carbon increases more and more by the repetition of the cycles (*i. e.* of the reduction and oxidation phases of the process) and consequently the impurity of the resulting hydrogen becomes greater and greater. From this the necessity of employing means for the prevention of the precipitation of carbon during the reduction phase will be evident. The precipitation of carbon from the heated carbon monoxid takes place, as is well known, according to the equation:

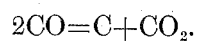
$$2CO = C + CO_2.$$

In order to prevent this precipitation of carbon the following method is used:

The gases destined for reduction and containing carbon monoxid and hydrocarbons are mixed with a quantity of steam such that the steam volume amounts, at the most, to half of the volume of the carbon monoxid plus that of the hydrocarbons. For reducing the ferric oxid (or $Fe_3O_4$) this mixture may be directly led into the retorts or tubes containing the iron oxid without a considerable amount of carbon being precipitated. The reason of this satisfactory result is as follows: If carbon monoxid be mixed with steam, hydrogen and carbon dioxid are formed and the volume of the first is the same as that of the carbon monoxid transformed into $CO_2$ by the oxidation. In place of CO therefore an equal volume of $H_2$ and an equal volume of $CO_2$ is formed according to the equation:

$$CO + H_2O = H_2 + CO_2.$$

In general the reaction with hydrocarbons is as follows:

$$CmHn + 2mH_2O = 2mH_2 + nH + mCO_2.$$

For every volume of hydrocarbon therefore one volume of $CO_2$ and more than two volumes of hydrogen are formed. Now as only half of the carbon monoxid is oxidized by the steam to $CO_2$ (since the amount of steam added is only half that of the CO) as final product a gas of the following atomic composition is obtained according to the equation:

$$2CO + H_2O = CO + H_2 + CO_2.$$

The gas used for the reduction of the iron therefore would yield for every volume of carbon monoxid one volume of hydrogen and one volume of carbon dioxid, or for two volumes of reducing gases one volume of carbon dioxid. This proportion however must not be changed on account of the reducing gases because otherwise the reduction of the $Fe_3O_4$ to metal no longer takes place. For this reason the addition of steam had to be restricted according to the above equation in order that the gas and steam mixture might be used directly for the reduction of the iron. This reducing gas of the composition $$CO + H_2 + CO_2$$

however precipitates considerably less carbon during the reduction than pure carbon monoxid or carbon dioxid mixed with nitrogen (producer gas) would do. The reason for this lies in the presence of the hydrogen. The latter first attacks the ferric oxid with formation of steam which again reacts on the carbon monoxid and thus again produces hydrogen and carbon dioxid. By this means the carbon monoxid tending to precipitate carbon is continually reduced, whereas the carbon dioxid and the hydrogen (neither of which precipitates carbon) is increased. From this it is evident that the presence of hydrogen considerably restricts the precipitation of carbon from the carbon monoxid. As a feature of the present invention therefore it is necessary to provide for the addition of steam in such manner that its volume only amounts to about half of the combined volume of the carbon monoxid and that of the hydrocarbons contained in the gas.

The reduction of ferric oxids to spongy iron by means of reducing gases takes place, as is well known, only very gradually the iron being gradually reduced to lower stages of oxidation according to the following equations:

$$3Fe_2O_3 + CO = 2Fe_3O_4 + CO_2$$
$$2Fe_3O_4 + CO = Fe_6O_7 + CO_2$$
$$Fe_3O_4 + CO = 3FeO + CO_2$$

from which combinations metallic iron is only formed by a further reduction according to the equation:

$$Fe_6O_7 + 7CO = 3Fe_2 + 7CO_2.$$

A large quantity involving a surplus of reducing gas is necessary in order to render the reduction to spongy iron complete. Since between the products of oxidation ($CO_2$, $H_2O$) produced and the reducing gases (CO, H, CnHm) a relationship of equal weights subsists which is not affected even by prolonged reaction on the ore, the waste gas of the reduction always contains a considerable amount of reducing gases. The more unfavorable the proportion of undecomposed and decomposed gases in the waste gases becomes, the more difficult is it to reduce the ore. As I have found by experiments, the reduction takes place easily at the beginning, whereas it becomes more difficult as the ore becomes poorer in oxygen and the further reduction to spongy iron has progressed.

Since the final purpose of the present process is not to produce metallic iron but hydrogen, a method of working has been found by which alone an efficient production of hydrogen is obtained and which is therefore of great importance. Obviously it is immaterial for the production of the hydrogen whether, during the reduction phase metallic iron or a lower stage of oxidation than that of black oxid of iron is produced, since Fe as well as FeO and $Fe_6O_7$ for instance are oxidized when acted on by $H_2O$ at incandescence by means of steam to $Fe_3O_4$, while giving off hydrogen according to the formula:

$$3Fe + 4H_2O = Fe_3O_4 + 4H_2 \text{ or}$$
$$Fe_6O_7 + H_2O = 2Fe_3O_4 + H_2.$$

Now it has been found that the proportion of the gases necessary for the reduction relatively to the hydrogen produced during the oxidation phase remains relatively small and that efficient working of the process is only possible, if the reduction of the ferric oxid ($Fe_3O_4$) during the reduction phases is only incompletely effected (at most only half reduced). This method of working has as a further object, to obtain a degree of purity of the hydrogen necessary for the use to which it is to be put. It has to be considered that spongy iron takes up from the reducing gases a considerable amount of carbon formed by the decomposition of carbon monoxid according to the equation:—

$$2CO = CO_2 + C.$$

By the reaction of the steam during the oxidation phase, several gases are formed from these carbon-iron combinations (methane carbon dioxid and hydrocarbons) contaminating the hydrogen. This absorption of carbon is impossible as long as (in addition to spongy iron) a surplus of oxids is contained in the ore. If, for instance carbon were actually taken up it would of necessity have to be decomposed again by the oxygen of the oxid present, according to the equation $$Fe_6O_7 + C = 6FeO + Co.$$

Now what I claim and desire to secure by Letters Patent is the following:

1. In a process for producing hydrogen by the alternate reduction of iron oxid by means of reducing gases and oxidation of the iron oxid, the improvement which consists in employing steam in the reduction phase in such quantity that its volume is, at the highest, half that of the combined volumes of the carbon monoxid and the hydrocarbons contained in the gas, substantially as described.

2. A process for producing hydrogen, which comprises a reduction of the metallic oxid by means of gases including carbon monoxid and different hydrocarbons, and the introduction of steam into such gases in such an amount that a reducing gas of the composition $CO + H_2 + CO_2$ is obtained, of which the CO will be decomposed by the steam resulting from the reaction of the hydrogen on the metallic oxid; substantially as described.

3. In a process for producing hydrogen by the alternate reduction of iron oxid and oxidation of the iron, the improvement which consists in carrying out the reduction phase in such a manner that the ferric oxid in all parts of the reduction-furnace is only partly reduced in order to reduce the amount of reducing gases necessary for one volume of hydrogen produced and to prevent the absorption of carbon, substantially as described.

4. In a process for producing hydrogen by the alternate reduction of iron oxid and oxidation of the iron, the improvement which consists in carrying out the reduction phase in such manner that the ferric oxid in all parts of the reduction furnace is not more than half reduced, in order to reduce the amount of reducing gases necessary for one volume of hydrogen produced and to prevent the absorption of carbon, substantially as described.

In testimony, that I claim the foregoing as my invention, I have signed my name in presence of two witnesses, this 21st day of November 1908.

ANTON MESSERSCHMITT.

Witnesses:
 JEAN GRUND,
 CARL GRUND.